March 3, 1959 R. W. MacDONNELL 2,875,707
ADJUSTABLE BULKHEAD FOR FREIGHT VEHICLE BODIES
Filed Oct. 19, 1956 5 Sheets-Sheet 1
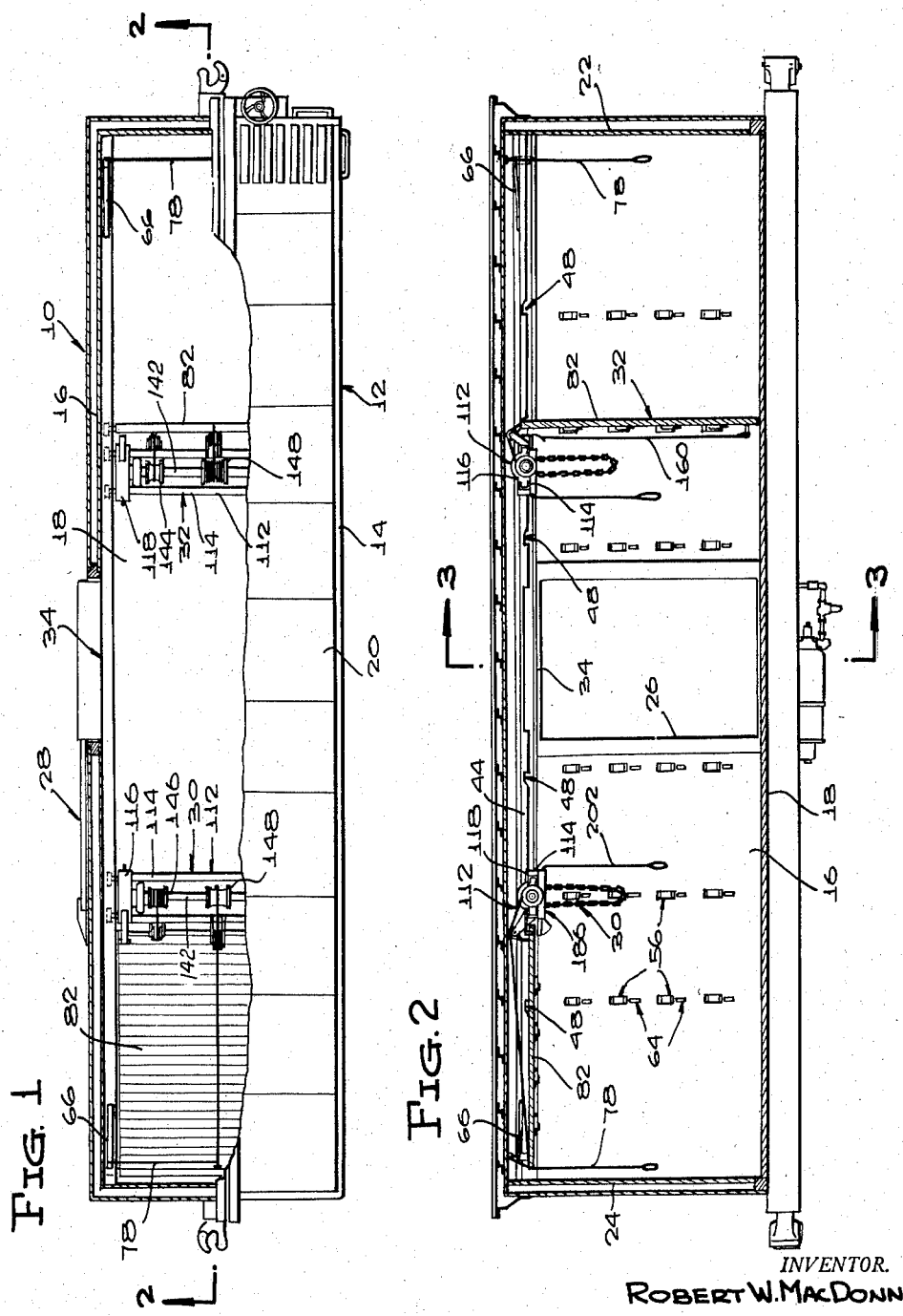
INVENTOR.
ROBERT W. MacDONNELL
BY
McMorrow, Berman & Davidson
ATTORNEYS

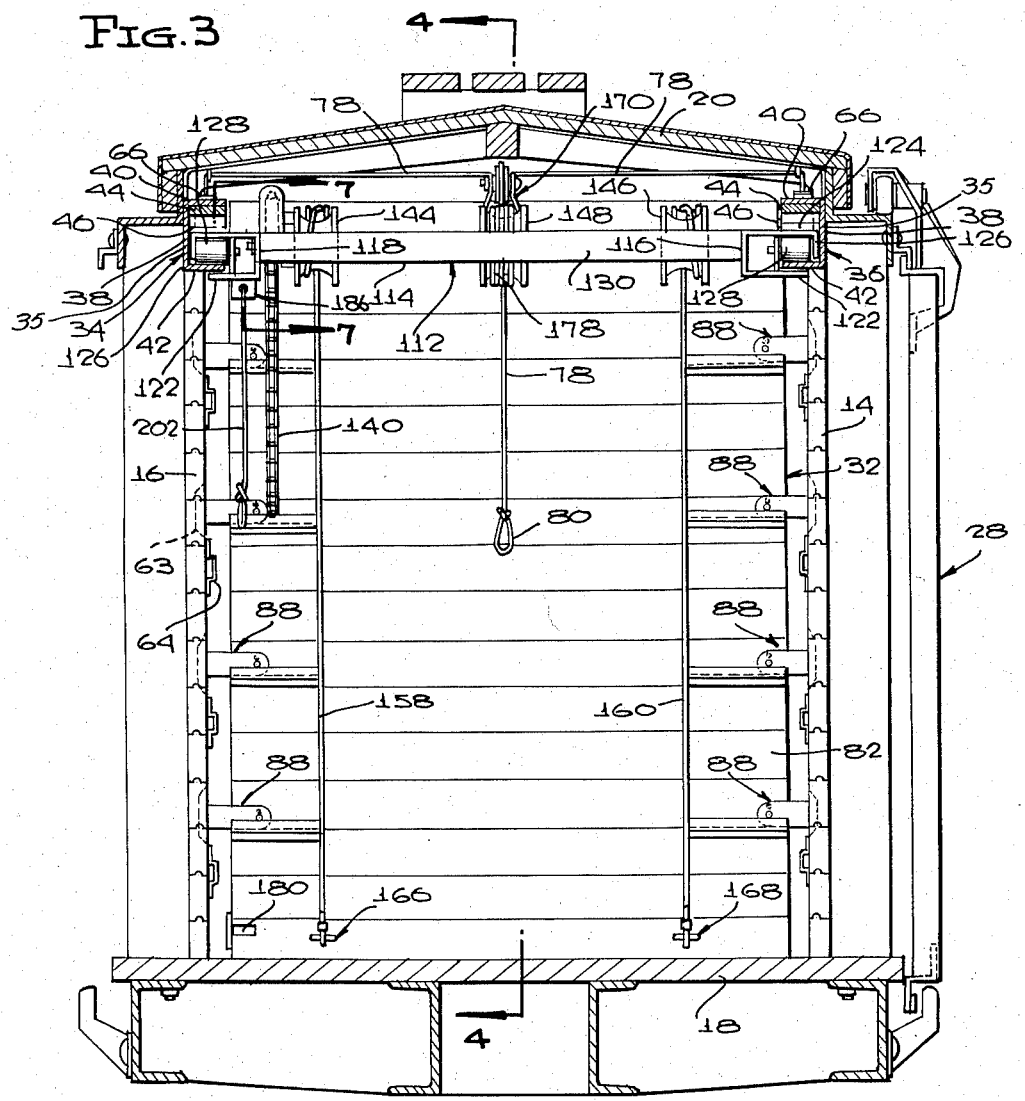

March 3, 1959 R. W. MacDONNELL 2,875,707
ADJUSTABLE BULKHEAD FOR FREIGHT VEHICLE BODIES
Filed Oct. 19, 1956 5 Sheets-Sheet 3

INVENTOR.
ROBERT W. MacDONNELL
BY
McMorrow, Berman + Davidson
ATTORNEYS

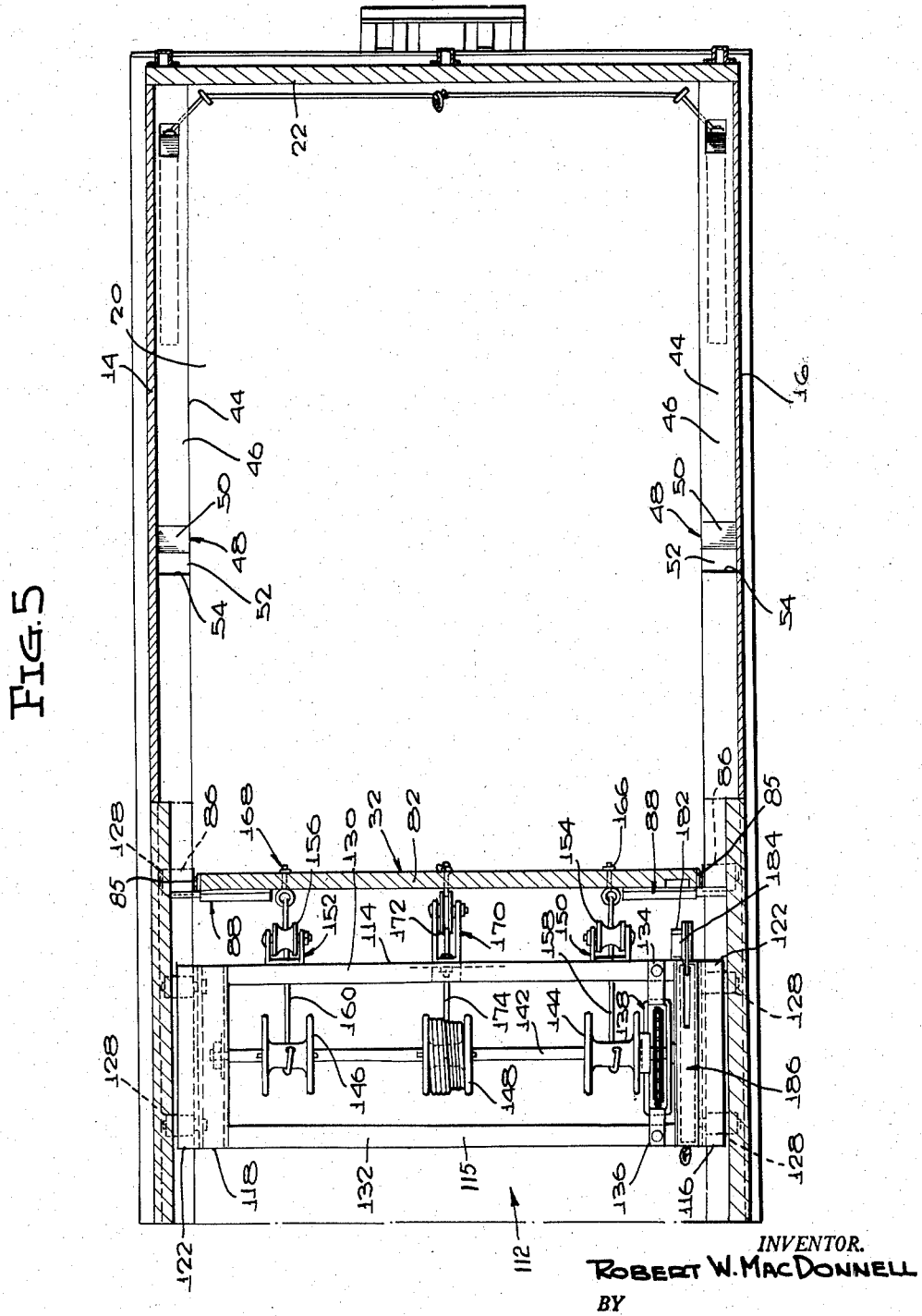

March 3, 1959  R. W. MacDONNELL  2,875,707
ADJUSTABLE BULKHEAD FOR FREIGHT VEHICLE BODIES
Filed Oct. 19, 1956  5 Sheets-Sheet 5
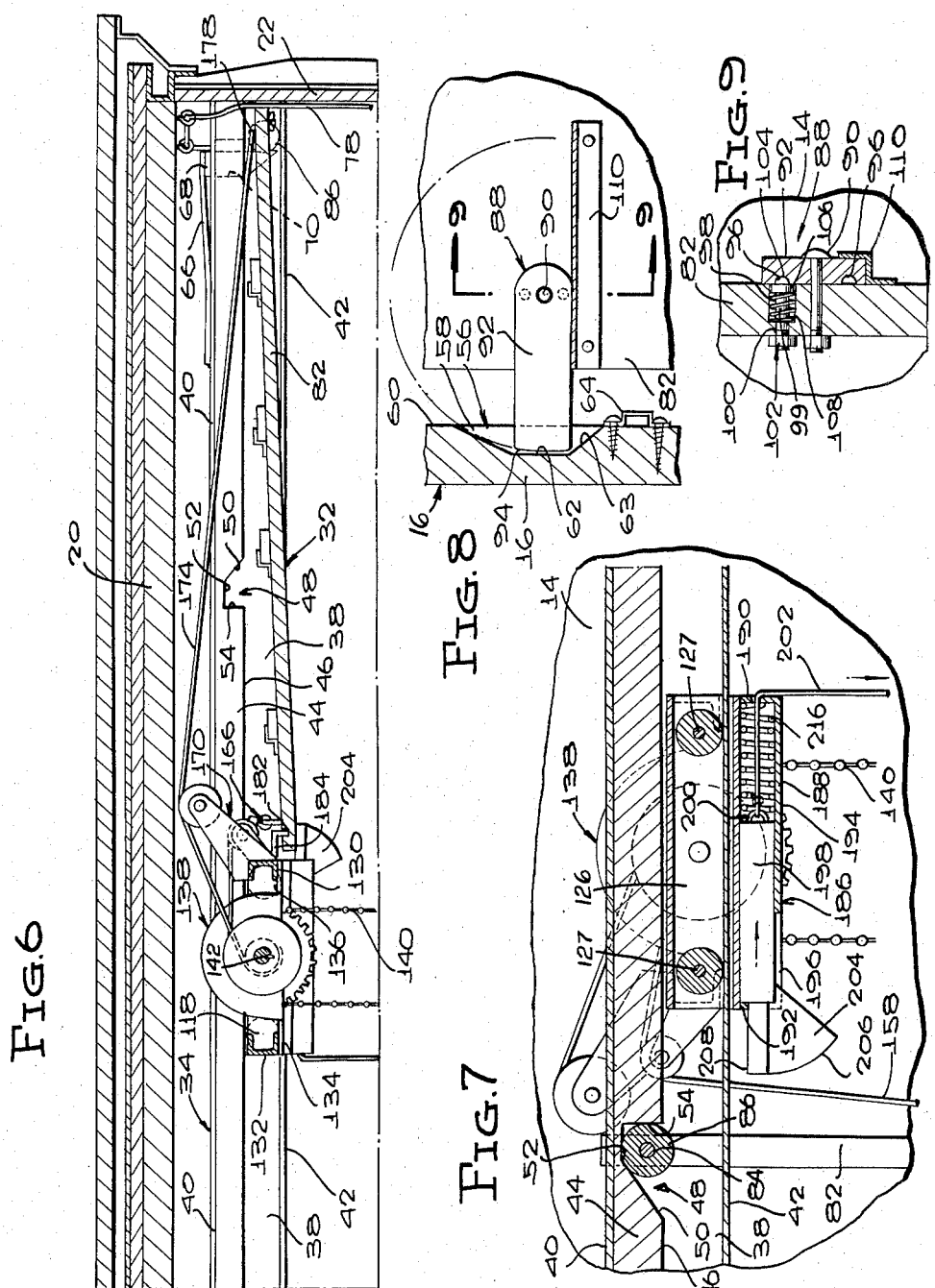
INVENTOR.
ROBERT W. MacDONNELL
BY
McMorrow, Berman & Davidson
ATTORNEYS

United States Patent Office 2,875,707
Patented Mar. 3, 1959

2,875,707

ADJUSTABLE BULKHEAD FOR FREIGHT VEHICLE BODIES

Robert W. MacDonnell, Mount Clemens, Mich., assignor of one-half to Gordon W. Sieg, Mount Clemens, Mich.

Application October 19, 1956, Serial No. 617,169

7 Claims. (Cl. 105—376)

This invention relates to improved adjustable bulkhead for compartmenting a freight vehicle body, such as that of a railroad car, automotive trailer, and the like.

The primary object of the invention is to provide for a freight vehicle body a more practical and efficient adjustable bulkhead assembly, which is adjustable longitudinally of the body, and which can be readily stored in an overhead horizontal position in the body so that substantially the entire interior of the vehicle body is available for storage for freight while the bulkhead assembly is in storage position.

Another object of the invention is to provide in an adjustable bulkhead of the character indicated, means whereby the bulkhead can be set up in different positions along the vehicle body for defining compartments of different lengths, by a single workman, whereby great economy of man power is realized.

A further object of the invention is to provide an adjustable bulkhead of the character indicated which can be made in rugged and serviceable forms at relatively low cost, is easily installed, is simple to use and maintain, and is highly satisfactory for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a top plan view of a railroad box car body a portion of the roof being broken away, showing two adjustable bulkheads in accordance with the present invention therein, one of which is shown in storage position, and the other in a set up position;

Figure 2 is a vertical longitudinal section taken substantially on the plane of line 2—2 of Figure 1;

Figure 3 is an enlarged vertical transverse section taken substantially on the plane of line 3—3 of Figure 2;

Figure 5 is a horizontal section view taken substantially on the plane of line 5—5 of Figure 4;

Figure 6 is a fragmentary vertical longitudinal section view, similar to a portion of Figure 4, showing a bulkhead in storage position;

Figure 7 is a further enlarged fragmentary vertical longitudinal section view taken substantially on the plane of line 7—7 of Figure 3;

Figure 8 is a further enlarged vertical transverse section view taken substantially on the plane of line 8—8 of Figure 4; and Figure 9 is a still further enlarged fragmentary vertical section view taken substantially on the plane of line 9—9 of Figure 8.

Figure 4:
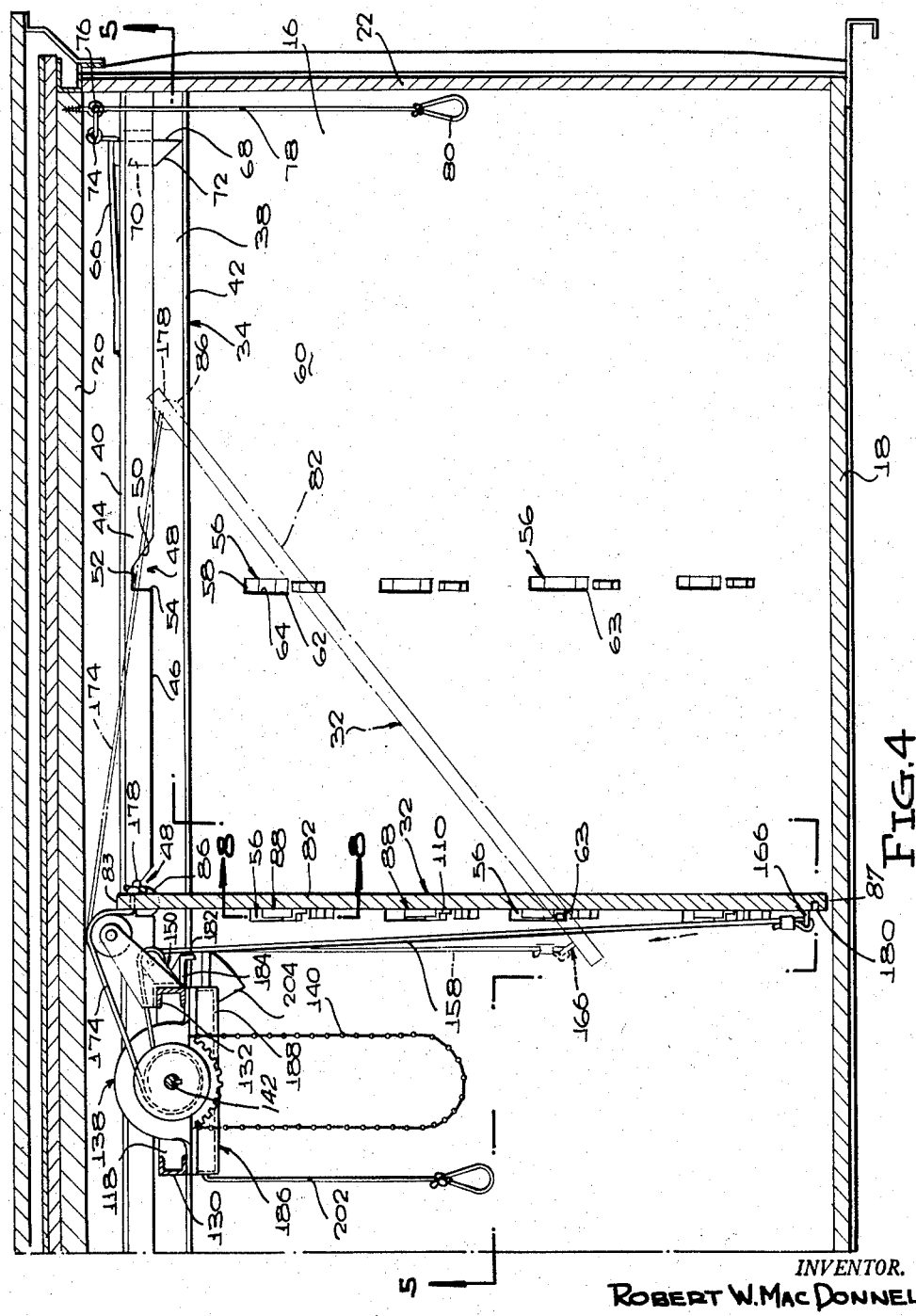
Figure 4 is a further enlarged fragmentary vertical section taken substantially on the plane of line 4—4 of Figure 3, showing a bulkhead in set-up position in full lines and in process of being moved to storage position in phantom lines.

Referring to the drawings in detail, a railroad box car, indicated generally at 10, has a box body 12 having opposite longitudinally extending side walls 14 and 16 suitably secured to a floor 18, and a roof 20. The body 12 further includes transverse end walls 22 and 24, and one or both of the side walls 14 and 16 has thereon a door opening 26, with a sliding door, indicated generally at 28, mounted on the side wall 16 for closing the door opening 26.

Indicated generally at 30 and 32 are two similar but reversed longitudinally adjustable bulkhead assemblies installed in the body 12 of the box car for the purpose of defining compartments therein of different lengths.

The side walls 14 and 16 of the body 12 have suitably secured to their inward sides longitudinally extending horizontal guide tracks, indicated generally at 34 and 36, which comprise channels 35 opening toward each other and having webs 38 and parallel upper and lower flanges 40 and 42, respectively. Suitably secured to and positioned in and extending the length of the channels 35, at the junctures between the webs 38 and the upper flanges 40 are bars 44 having lower edges 46 vertically spaced above the upper surfaces of the lower flanges 42 of the channels 35. At longitudinally spaced intervals the lower edges 46 of the bars 44 have downwardly opening notches 48, having angled ends 50 at one end of horizontally disposed portions 52, and perpendicular ends 54 at the other ends of the notches.

Indenting the inner sides of the body side walls 14 and 16 are vertically aligned and spaced below the notches 54 vertically elongated grooves 56 which have upwardly angulated upper ends 58, see Figure 8, and downwardly angulated lower ends 63.

Suitably secured on the inner sides 60 of the side walls 14 and 16, preferably below the grooves 62, are loops 64 providing means for lashing cargo in position in the vehicle body 12.

Secured, as by means of welding, on the upper surfaces of the upper flanges 40 of the channels 35 and extending toward the body and walls 22 and 24 are resilient leaf springs 66 having on their free ends dogs 68 which are vertically disposable downwardly through openings 70 in the upper flanges 42 of the channels 35. The lower ends of the dogs 68 are tapered, as indicated at 72, on the sides thereof remote from the body end walls 22 and 24.

Suitably secured to the car body roof 20 and overlying the free ends of the leaf springs 66 are depending eyes 76 which are in laterally spaced relationship to eyes 74 fixed on the free ends of the springs 66. One end of flexible cords 78 is connected to the eyes 74 on the free ends of the leaf springs 66, and their other ends are passed through the eyes 76 and formed as hand loops 80. Accordingly, when pull is applied to the cords 78, the leaf springs 66 together with the dogs 68 are elevated from the solid line position shown in Figure 4, so that the lower flanges 42 of the channels 35 are unencumbered by the dogs 68.

The adjustable bulkhead assemblies 30 and 32 are identical in structure and only the bulkhead 32 is herein described in detail.

The adjustable bulkhead 32 comprises a substantially rectangular panel 82 of any suitable material, such as wood, metal, or the like, having an upper edge 83 and opposite side edges 85. Pintle 84 are secured to and extend laterally outwardly from the side edges 85 near the upper edge 83, and have mounted thereon rollers 86 which roll upon tracks constituted by the lower flanges 42 of the channels 35 and are normally positioned in notches 48 in the bars 44 in the normal depressed positions of the bars 44.

Pivoted at 90 on one side of the panel 82 at the side edges 85 of the panel and extensible therebeyond, are latch assemblies 88 which are engageable in the grooves 56 in the side walls 14 and 16 of the vehicle body 12 to hold the panel in set-up position. Each of the latch assemblies 88, see Figures 8 and 9, comprises a pivot 90 secured in the panel 82 in spaced relation from the related side edge 85 of the panel, on which is pivoted a latch bar 92 having a free end 94 engageable into a related groove 56. For retaining the bar 92 in a horizontal operative position, shown in Figure 8, wherein the free end 94 is engaged in a groove 56, and for holding the latch bar in a retracted vertical position, the latch bar 92 incorporates on the surface thereof adjacent the panel 82 a pair of diametrically opposed detent recesses 96, see Figure 9, which are selectively registrable with the end 104 of a spring-pressed detent assembly 102. The detent assembly 102 is secured in a bore 100 in the panel 82 and comprises a shank 98 having a head 106 thereon, and a coil spring 108 circumposed on the shank 98 between the head 106 and a shoulder 99 in the bore 100. The latch bar 92 is supported in its horizontal operative position in a bracket 110 secured to the panel. Engagement of the latch bars 92 in the grooves 56 holds the panel 82 with its rollers 86 in the notches 48 of the bars 44, with the rollers in engagement with the perpendicular ends 54 of the notches so that the panel 82 is retained against swinging and against longitudinal displacement along the vehicle body. Obviously the bulkheads can be set up at any point along the car body where there exist series of grooves 56, and notches 48 in the bars 44.

There is provided for each panel 82 and located at the side thereof remote from the related end wall of the body 12, a hoisting assembly, indicated generally at 112. Each hoist assembly 112 comprises a carriage 114 comprising a frame 115 having end members 116 and 118, which, as most clearly shown in Figure 3, are tubular in cross section and have lower and upper flanges 122 and 124, respectively. The upper flange 124 terminates in a depending end flange 126. The flanges 122 are disposed beneath the upper flanges 42 of the guide channels 35, with the flanges 124 extending in the guide channels 35 between the lower flanges 42 and the lower edges 46 of the bars 44. The depending flanges 126 have extending therebetween longitudinally spaced transverse shafts 127 having journaled thereon rollers 128 riding on the upper surfaces of the lower flanges 42 of the channels 35. Extending between and secured to the opposite ends of the frame end members 116 and 118 are side members 130 and 132.

Located between the frame side members 130 and 132 adjacent the end member 116 is a chain fall, indicated generally at 138, having end portions 134 and 136 secured to the side members 130 and 132. The chain fall 138 comprises a depending endless chain 140. A transverse shaft 142 has one end suitably keyed to the chain fall 138 and its other end journaled in the end member 118, as clearly seen in Figure 5. Application of downward pull on the chain 140 causes rotation of the shaft 142 in one direction or the other. Suitably keyed on the shaft 142 in longitudinally spaced relationship thereon are reels 144 and 146. Keyed on a central intermediate portion of the shaft 142 between the reels 144 and 146 is a larger diameter drum 148. Suitably secured on the side member 130 and extending toward the related panel 82 on substantially the level of and in line with the reels 144 and 146 are idler pulley assemblies, indicated generally at 150 and 152, incorporating pulleys 154 and 156, respectively, over which intermediate portions of cables or cords 158 and 160, respectively, are trained.

One end of the cables 158 and 160 are secured to the reels 144 and 146, respectively. The cables are trained over the idler pulleys 154 and 156 and extend downwardly along the panel 82 and have their other ends secured to eye bolts 166 and 168, respectively, secured near the lower edge of the panel 82.

Suitably secured to the carriage frame side member 130 and extending toward the panel 82 is an idler pulley assembly, indicated generally at 170, incorporating an idler pulley 172 located above the upper edge 83 of the panel 82 and above the idler pulleys 154 and 156. The idler pulleys 154 and 156 are in axial alignment with each other. A cable 174, similar to the cables 158 and 160, has one end suitably secured to the drum 148, is trained over the pulley 172, and has its other end secured to the panel 82 adjacent the upper edge 83 thereof, as indicated at 178.

In order to move the panel 82 from a perpendicular or operative or set-up position to a horizontal storage position, the latch bars 92 having been disengaged from the grooves 56, one side of the chain fall chain 140 is pulled downwardly, so as to rotate the shaft 142 in a direction to wind the various cables on the reels and the drum 148. As this action starts, the panel rollers 86 are elevated off the lower flanges 42 of the guide channels 35 into the notches 48 by the cable 174 on the central drum 148 as the panel 82 rises, so that the rollers 86 and the notches 48 form a hinge for the panel. As this action proceeds, the cables on the outer reels are wound up and pull the panel 82 upwardly to the horizontal storage position, shown in Figure 6. Because of the larger diameter of the drum 148 its cable 174 is wound thereon faster than on the reels, so that the elevation of the panel 82 precedes its upward swinging by the reel cables.

The panel 82 has at one side edge 85 thereof near the lower edge 87 of the panel and in the side of the panel at which the hoist assembly is located, a slot 180, see Figures 3 and 4, for receiving a depending flange 182 on a bracket 184 on the frame side member 132 of the carriage 114 when the panel is in its storage position, for precluding relative longitudinal movements of the panel 82 and the carriage.

As shown in Figures 4 and 7, there is suitably secured to the underside of the carriage frame end member 116 a releasable latch, indicated generally at 186, for securing the lower edge 87 of the panel 82 to the carriage 114. The latch 186 comprises a horizontal longitudinal cylinder 188, having an apertured end wall 190 remote from the panel 82. The opposite end wall 192 of the cylinder 188 and the bottom of the side wall 194 of the cylinder have therein an L-shaped slot 196. Slidable in the cylinder 188 in an elongated plunger 198 having suitably secured on the end thereof adjacent the end wall 190 an eye 200 having secured thereto one end of a flexible cord 202, which extends through the apertured end wall 190 and depends therefrom to a readily accessible position adjacent the car body side wall 16, see Figure 3. Integral with the plunger 198 and normally extending beyond the end wall 192 is a depending cam plate 204 having an arcuate cam edge 206 which, when engaged by the lower edge 87 of the panel 82, as the panel is moving upwardly to storage position, results in displacement of the plunger 198 which permits the lower edge 87 of the panel 82 to engage over and be supported on the upper edge 208 of the cam plate 204. Circumposed on the plunger 198 and compressed between the plunger 198 and the end wall 190, is a coil spring 210 which is compressed as the panel 82 is moved upwardly into engagement with the cam edge 206 of the cam plate 204. The spring 210 is effective to urge the cam plate beneath the lower edge of the panel 82, following displacement of the plunger described.

When the lower edge of the panel 82 is disposed above the portion 268 of the cam plate 204, the flange 182 is engaged in the slot 180 in the panel 82.

Pulling down on the cord 202 overcomes the tension of the spring 210 and retracts the plunger 198 and the cam plate 204, so that the panel 82 is freed to be lowered to a perpendicular position by operation of the chain fall.

After the panel 82 has been raised to its storage position, the carriage 114 together with the panel 82 can be moved along the guide channels 35 to a related end wall of the car body 12, as shown in Figure 6, wherein the rollers 86 engage the angular edges 72 of the dogs 68 so that the dogs 68 are elevated against the resistance of the leaf springs 66, and the rollers 86 pass the dogs 68, whereat the dogs are free to move downwardly into the openings 70 in the channels 35 behind the rollers 86, whereby the panel 82 and its carriage 114 are secured against the shifting during starts and stops of the car.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. In combination, a freight vehicle body having side walls, end walls, and a roof, longitudinal horizontal tracks comprising inwardly facing guide channels secured to the inner sides of the side walls near the roof, each channel having a web and vertically spaced upper and lower flanges, a panel having top, bottom, and opposite side edges, said panel being positioned between the guide channels, horizontal rollers on said side edges near the top edge of the panel engaged in the channels and rolling upon said lower flanges, longitudinal bars positioned in said channels, said bars being narrower than the spaces between the upper and lower flanges of the channels and being positioned between the upper flanges and the panel rollers, said bars having lower edges, notches in and spaced along the lower edges of said bars, vertical rows of vertically elongated and vertically spaced grooves in the inner sides of the body side walls, said rows being spaced along the side walls and being in vertical alignment with said notches, vertically spaced retractable latch bars on said panel arranged to be extended beyond the side edges of the panel to engage in related grooves of said rows to hold the panel in a perpendicular set-up position, first means connected to an upper part of the panel for elevating the panel to position its rollers in the notches of the bars, and second means connected to a lower part of the panel for swinging the panel upwardly on the axis of the rollers toward the roof with the rollers engaged in the notches to assume a horizontal storage position.

2. In combination, a freight vehicle body having side walls, end walls, and a roof, longitudinal horizontal tracks comprising inwardly facing guide channels secured to the inner sides of the side walls near the roof, each channel having a web and vertically spaced upper and lower flanges, a panel having top, bottom, and opposite side edges, said panel being positioned between the guide channels, horizontal rollers on said side edges near the top edge of the panel engaged in the channels and rolling upon said lower flanges, longitudinal bars positioned in said channels, said bars being narrower than the spaces between the upper and lower flanges of the channels and being positioned between the upper flanges and the panel rollers, said bars having lower edges, notches in and spaced along the lower edges of said bars, vertical rows of vertically elongated and vertically spaced grooves in the inner sides of the body side walls, said rows being spaced along the side walls and being in vertical alignment with said notches, vertically spaced retractable latch bars on said panel arranged to be extended beyond the side edges of the panel to engage in related grooves of said rows to hold the panel in a perpendicular set-up position, first means connected to an upper part of the panel for elevating the panel to position its rollers in the notches of the bars, and second means connected to a lower part of the panel for swinging the panel upwardly on the axis of the rollers toward the roof with the rollers engaged in the notches to assume a horizontal storage position, a carriage positioned at one side of said panel comprising a frame having rollers rolling upon the lower flanges of the guide channels, a transverse shaft journaled on and extending across the carriage, said first means comprising a relatively large diameter drum secured on said shaft having a cable wound thereon and secured to the panel near its upper edge, said second means comprising a smaller diameter reel secured on said shaft having wound thereon a cable secured to the panel near the lower edge of the panel, and rotating means mounted on the carriage and operatively connected to said shaft for rotating the large diameter drum and the small diameter reel in winding directions.

3. In combination, a freight vehicle body having side walls, end walls, and a roof, longitudinal horizontal tracks comprising inwardly facing guide channels secured to the inner sides of the side walls near the roof, each channel having a web and vertically spaced upper and lower flanges, a panel having top, bottom, and opposite side edges, said panel being positioned between the guide channels, horizontal rollers on said side edges near the top edge of the panel engaged in the channels and rolling upon said lower flanges, longitudinal bars positioned in said channels, said bars being narrower than the spaces between the upper and lower flanges of the channels and being positioned between the upper flanges and the panel rollers, said bars having lower edges, notches in and spaced along the lower edges of said bars, vertical rows of vertically elongated and vertically spaced grooves in the inner sides of the body side walls, said rows being spaced along the side walls and being in vertical alignment with said notches, vertically spaced retractable latch bars on said panel arranged to be extended beyond the side edges of the panel to engage in related grooves of said rows to hold the panel in a perpendicular set-up position, first means connected to an upper part of the panel for elevating the panel to position its rollers in the notches of the bars, and second means connected to a lower part of the panel for swinging the panel upwardly on the axis of the rollers toward the roof with the rollers engaged in the notches to assume a horizontal storage position, a carriage positioned at one side of said panel comprising a frame having rollers rolling upon the lower flanges of the guide channels, a transverse shaft journaled on and extending across the carriage, said first means comprising a relatively large diameter drum secured on said shaft having a cable wound thereon and secured to the panel near its upper edge, said second means comprising a smaller diameter reel secured on said shaft having wound thereon a cable secured to the panel near the lower edge of the panel, and rotating means mounted on the carriage and operatively connected to said shaft for rotating the large diameter drum and the small diameter reel in winding directions, latch means mounted on said carriage comprising a spring pressed plunger having a cam plate thereon having an arcuate cam edge and an upper edge, said cam edge being engageable by the lower edge of the panel on upward swinging of the panel toward its storage position for displacing the plunger and to enable the lower edge of the panel to supportably engage over the upper edge of the cam plate in the storage position of the panel.

4. In combination, a freight vehicle body having side walls, end walls, and a roof, longitudinal horizontal tracks comprising inwardly facing guide channels secured to the inner sides of the side walls near the roof, each channel having a web and vertically spaced upper and lower flanges, a panel having top, bottom, and opposite side edges, said panel being positioned between the guide channels, horizontal rollers on said side edges near the top edge of the panel engaged in the channels and rolling upon said lower flanges, longitudinal bars positioned in said channels, said bars being narrower than the spaces between the upper and lower flanges of the channels and being positioned between the upper flanges and the panel rollers, said bars having lower edges, notches in and spaced along the lower edges of said bars, vertical rows of vertically elongated and vertically spaced grooves in the inner sides of the body side walls, said rows being spaced along the side walls and being in vertical alignment with said notches, vertically spaced retractable latch bars on said panel arranged to be extended beyond the side edges of the panel to engage in related grooves of said rows to hold the panel in a perpendicular set-up position, first means connected to an upper part of the panel for elevating the panel to position its rollers in the notches of the bars, and second means connected to a lower part of the panel for swinging the panel upwardly on the axis of the rollers toward the roof with the rollers engaged in the notches to assume a horizontal storage position, a carriage positioned at one side of said panel comprising a frame having rollers rolling upon the lower flanges of the guide channels, a transverse shaft journaled on and extending across the carriage, said first means comprising a relatively large diameter drum secured on said shaft having a cable wound thereon and secured to the panel near its upper edge, said second means comprising a smaller diameter reel secured on said shaft having wound thereon a cable secured to the panel near the lower edge of the panel, and rotating means mounted on the carriage and operatively connected to said shaft for rotating the large diameter drum and the small diameter reel in winding directions, latch means mounted on said carriage comprising a spring pressed plunger having a cam plate thereon having an arcuate cam edge and an upper edge, said cam edge being engageable by the lower edge of the panel on upward swinging of the panel toward its storage position for displacing the plunger and to enable the lower edge of the panel to supportably engage over the upper edge of the cam plate in the storage position of the panel, a depending detent flange on the carriage, one side of the panel having a slot near the lower edge of the door arranged to engage said detent flange in the storage position of the panel so as to preclude shifting of the panel longitudinally relative to the carriage.

5. In combination, a freight vehicle body having side walls, end walls, and a roof, longitudinal horizontal tracks comprising inwardly facing guide channels secured to the inner sides of the side walls near the roof, each channel having a web and vertically spaced upper and lower flanges, a panel having top, bottom, and opposite side edges, said panel being positioned between the guide channels, horizontal rollers on said side edges near the top edge of the panel engaged in the channels and rolling upon said lower flanges, longitudinal bars positioned in said channels, said bars being narrower than the spaces between the upper and lower flanges of the channels and being positioned between the upper flanges and the panel rollers, said bars having lower edges, notches in and spaced along the lower edges of said bars, vertical rows of vertically elongated and vertically spaced grooves in the inner sides of the body side walls, said rows being spaced along the side walls and being in vertical alignment with said notches, vertically spaced retractable latch bars on said panel arranged to be extended beyond the side edges of the panel to engage in related grooves of said rows to hold the panel in a perpendicular set-up position, first means connected to an upper part of the panel for elevating the panel to position its rollers in the notches of the bars, and second means connected to a lower part of the panel for swinging the panel upwardly on the axis of the rollers toward the roof with the rollers engaged in the notches to assume a horizontal storage position, a carriage positioned at one side of said panel comprising a frame having rollers rolling upon the lower flanges of the guide channels, a transverse shaft journaled on and extending across the carriage, said first means comprising a relatively large diameter drum secured on said shaft having a cable wound thereon and secured to the panel near its upper edge, said second means comprising a smaller diameter reel secured on said shaft having wound thereon a cable secured to the panel near the lower edge of the panel, and rotating means mounted on the carriage and operatively connected to said shaft for rotating the large diameter drum and the small diameter reel in winding directions, latch means mounted on said carriage comprising a spring pressed plunger having a cam plate thereon having an arcuate cam edge and an upper edge, said cam edge being engageable by the lower edge of the panel on upward swinging of the panel toward its storage position for displacing the plunger and to enable the lower edge of the panel to supportably engage over the upper edge of the cam plate in the storage position of the panel, a depending detent flange on the carriage, one side of the panel having a slot near the lower edge of the door arranged to engage said detent flange in the storage position of the panel so as to preclude shifting of the panel longitudinally relative to the carriage, downwardly spring pressed dogs on said upper flanges of the guide channels and located near the body end walls, said dogs extending downwardly through openings provided in the upper flanges of the channels in the paths of the panel rollers, said dogs having angle edges facing away from related body end walls and being arranged to be engaged by panel rollers on movement of the panel along the channels toward an end wall whereby the dogs are elevated to pass the panel rollers and to subside behind the panel rollers so as to hold the panel against longitudinal movement away from the end wall.

6. In a compartmenting bulkhead for a freight vehicle body, a pair of facing horizontal guide channels to be mounted on side walls of the body, each channel having upper and lower flanges, a panel having lateral horizontal rollers at its upper end engaged in the channels and rolling on the lower flanges of the channels, longitudinal bars positioned in the channels between the upper flanges and the rollers and having lower edges resting upon said rollers, notches in said lower edge spaced along the bars, in which said rollers can engage, latch means on the panel, portions on the body side walls which are vertically aligned with said notches and with which the latch means is engageable to hold the panel in a depressed perpendicular position, a carriage having horizontal rollers rolling on the lower flanges of the channels at one side of the panel, first means on the carriage and connected to an upper part of the panel for lifting the panel from its depressed position to engage its rollers in notches in the bars and thereby form therewith a hinge for the panel, second means on the carriage connected to a lower part of the panel for swinging the panel upwardly on said hinge from a perpendicular compartmenting position to a horizontal storage position, said first and second means being operatively connected together, and means for operating said first and second means together to elevate the panel and swing the panel upwardly in succession.

7. In a compartmenting bulkhead for a freight vehicle body, a pair of facing horizontal guide channels to be mounted on side walls of the body, each channel having upper and lower flanges, a panel having lateral horizontal rollers at its upper end engaged in the channels and rolling on the lower flanges of the channels, longitudinal bars positioned in the channels between the upper flanges and the rollers and having lower edges resting upon said rollers, notches in said lower edge spaced along the bars, in which said rollers can engage, latch means on the panel, portions on the body side walls which are vertically aligned with said notches and with which the latch means is engageable to hold the panel in a depressed perpendicular position, a carriage having horizontal rollers rolling on the lower flanges of the channels at one side of the panel, first means on the carriage and connected to an upper part of the panel for lifting the panel from its depressed position to engage its rollers in notches in the bars and thereby form therewith a hinge for the panel, second means on the carriage connected to a lower part of the panel for swinging the panel upwardly on said hinge from a perpendicular compartmenting position to a horizontal storage position, said first and second means being operatively connected together, and means for operating said first and second means together to elevate the panel and swing the panel upwardly in succession, and locking means on the carriage releasably connectible to said first and second means for holding the panel in its horizontal storage position.

References Cited in the file of this patent

UNITED STATES PATENTS

| | | | |
|---|---|---|---|
| 1,164,601 | Gibbs | Dec. 14, | 1915 |
| 1,193,254 | Gibbs | Aug. 1, | 1916 |
| 1,521,956 | Koziol | Jan. 6, | 1925 |
| 2,063,434 | Hersey et al. | Dec. 8, | 1936 |
| 2,071,802 | Sweeley et al. | Feb. 23, | 1937 |
| 2,171,317 | Steuber | Aug. 29, | 1939 |
| 2,227,807 | Dixon | Jan. 7, | 1941 |
| 2,629,338 | Koch | Feb. 24, | 1953 |